April 20, 1965 E. P. SCHELLENS 3,179,012
POLAR TRACE MILLING DEVICE
Filed Nov. 28, 1960 4 Sheets-Sheet 1
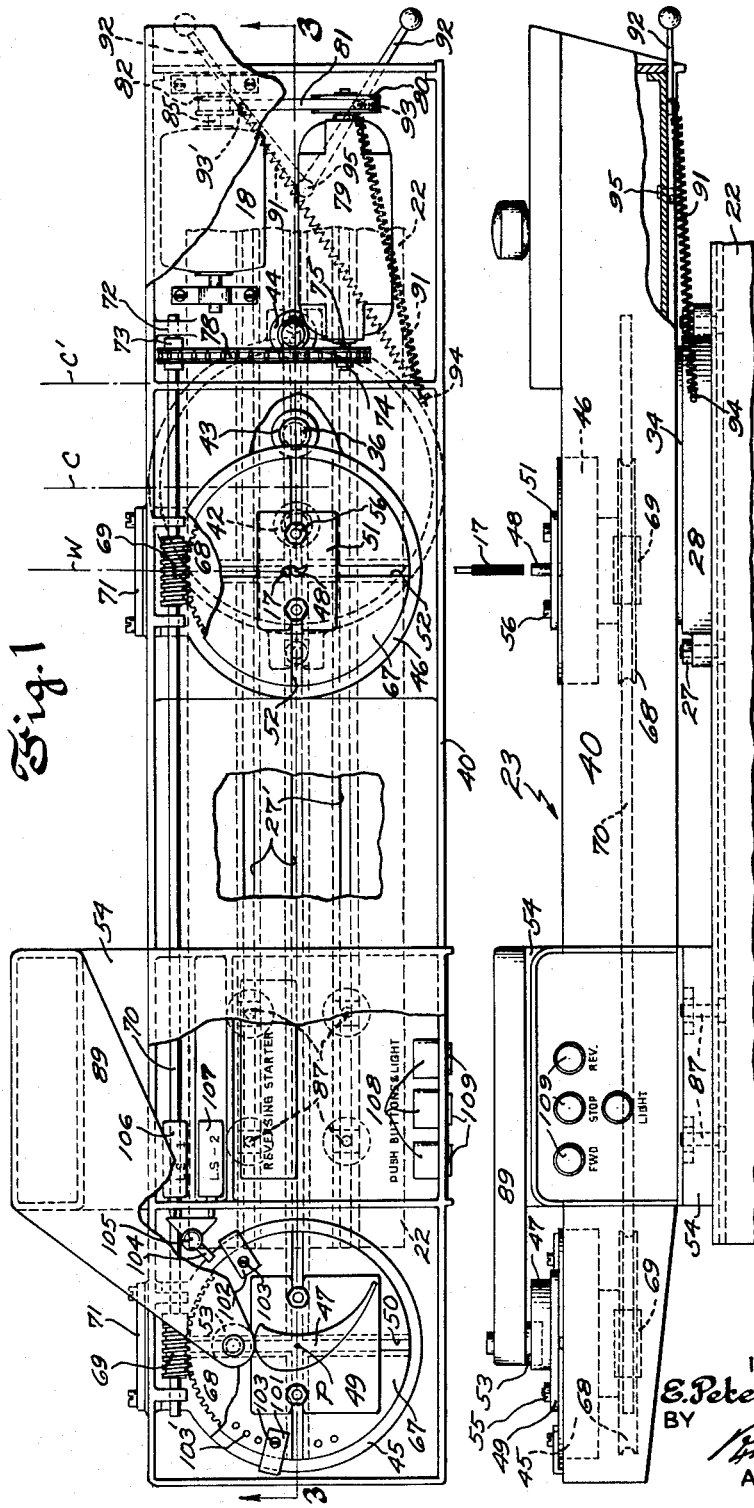
INVENTOR
E. Peter Schellens
BY
ATTORNEY

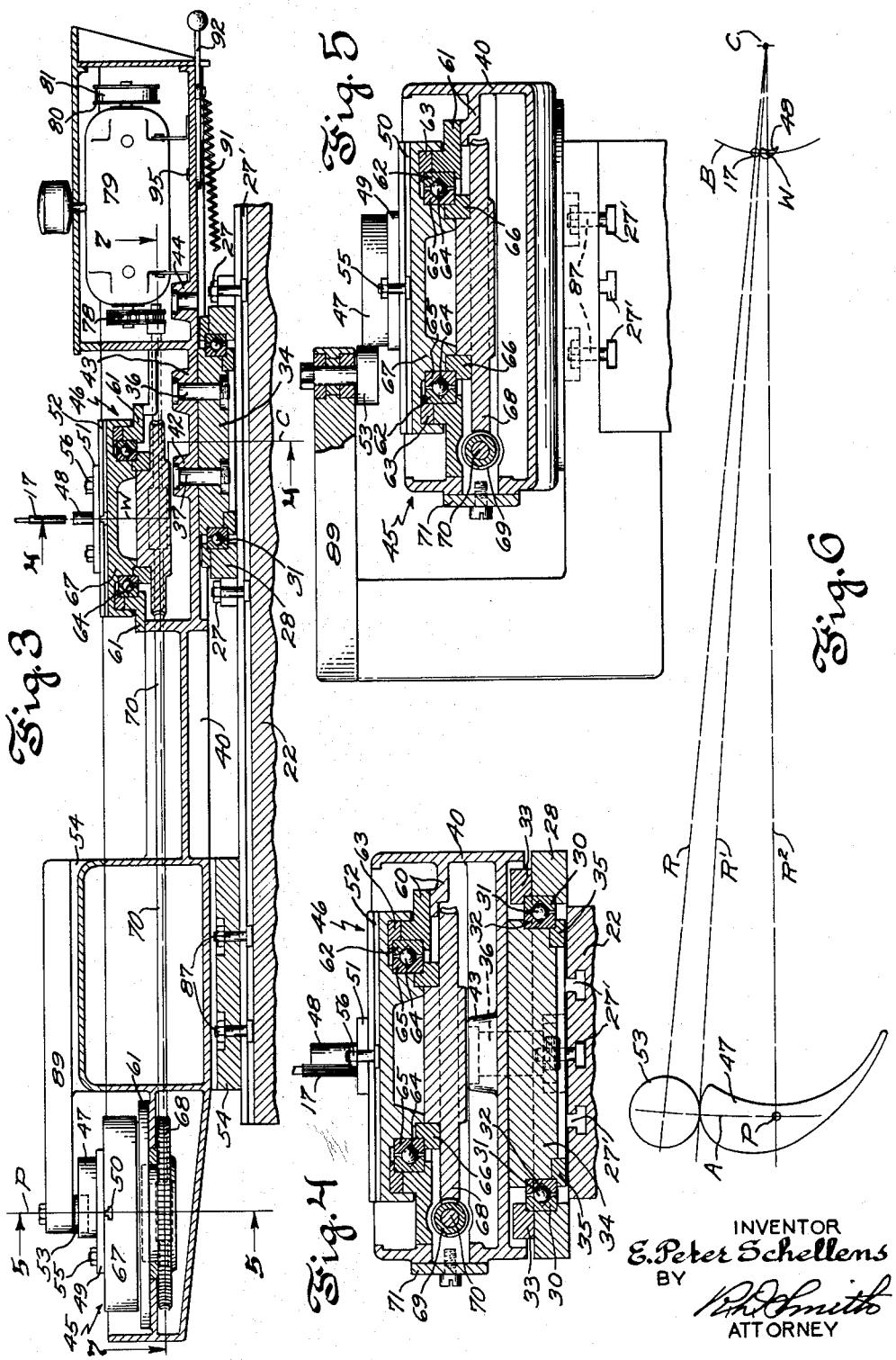

April 20, 1965 E. P. SCHELLENS 3,179,012
POLAR TRACE MILLING DEVICE
Filed Nov. 28, 1960 4 Sheets-Sheet 3
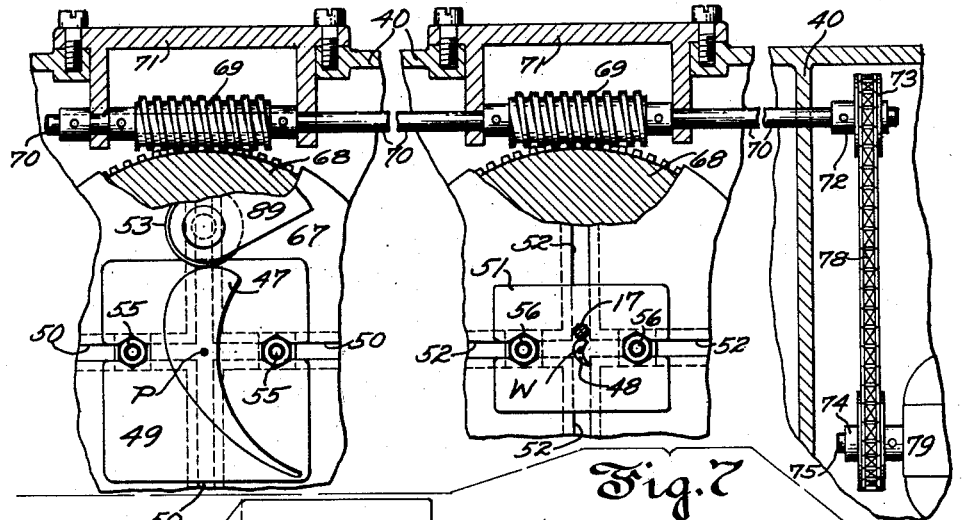
Fig. 7
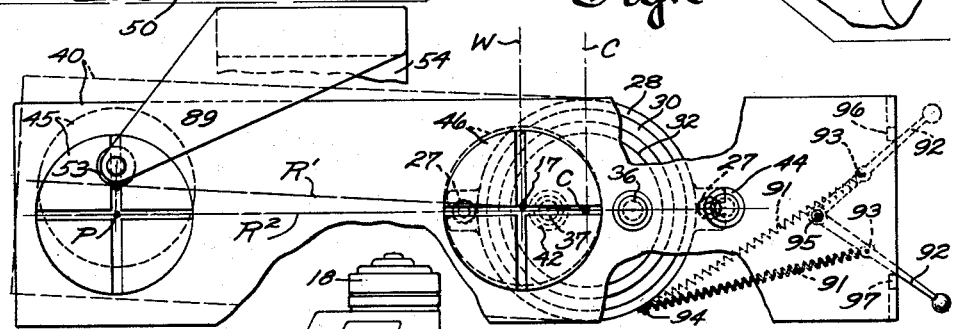
Fig. 8
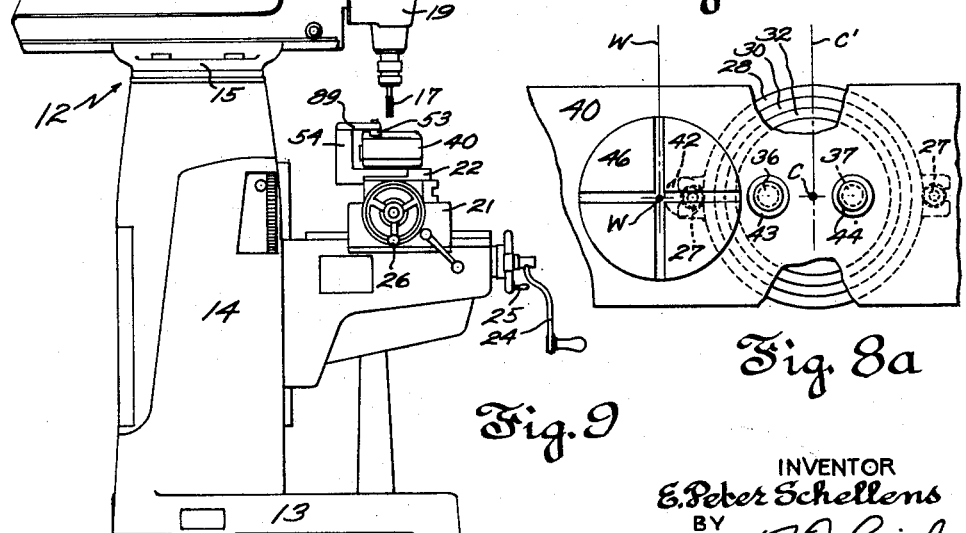
Fig. 9
Fig. 8a
INVENTOR
E. Peter Schellens
BY
ATTORNEY April 20, 1965  E. P. SCHELLENS  3,179,012
POLAR TRACE MILLING DEVICE
Filed Nov. 28, 1960  4 Sheets-Sheet 4

INVENTOR
E. Peter Schellens
BY
ATTORNEY

United States Patent Office 3,179,012  
Patented Apr. 20, 1965

3,179,012  
POLAR TRACE MILLING DEVICE  
Eugene Peter Schellens, Essex, Conn., assignor, by mesne assignments, to The Bridgeport Machines, Inc., Bridgeport, Conn., a corporation of Connecticut  
Filed Nov. 28, 1960, Ser. No. 72,195  
6 Claims. (Cl. 90—13.4)

This invention relates to a simplified method of automatically generating in a workpiece, as by milling, grinding or other process of machining, a profile or surface of revolution whose contour is other than circular about a given axis of generation. The present improvements also relate to apparatus that can be used as an aid in practicing the simplified method.

There have been proposed methods of generating two-dimensional surfaces of revolution from a master pattern or generatrix. One such method employs a cutting tool moving relatively to the workpiece with linear or radial relative motion, the workpiece being either mounted on a rotary spindle or table or on a cross-slide and such motion being responsive to corresponding motion of a pattern or generatrix. Another proposed method has been to employ the use of pantograph systems with the resultant complexity in structure and lack of rigidity.

Such methods have necessitated complicated costly mechanisms of objectionably large size and have failed to produce a desired precision of shape and surface finish in relatively small workpieces as for instance in so-called "buckets" or blades for steam or gas turbines and two-dimensional cams.

An object of the present improvements is to generate in a workpiece by a machining operation a profile contour or surface of revolution whose contour is other than circular and to generate such contour in a choice of different proportional sizes smaller than the otherwise like profile of a pattern, generatrix or master figure whose contour is to be simulated in reduced size in the workpiece.

Another object is to accomplish the generation of such contour by moving a workpiece instantaneously in a composite of feeding directions, one of said directions being bodily toward or away from a stationed rotary machining tool, and the other of said directions being rotational about an axis of generation.

Another object is to accomplish such feeding of the workpiece bodily toward or away from the machining tool by oscillatory movement of the workpiece in a circular arc of feeding travel that is smaller than a circular arc of governing travel in which the generatrix or master figure simultaneously perform ocillatory movement.

Another object is to rotate the master figure about an axis of generation while such axis itself oscillates in an arc of relatively large curvature, and to rotate the workpiece simultaneously in positive synchronism with the rotation of said master figure about an axis that oscillates in an arc of relatively smaller curvature while both of said axes of generation are maintained in rectilinear alignment with a single center of curvature of both of said arcs of oscillation.

A further object is to concentrate the pattern and work conveying mechanisms in a single, relatively light weight, unitary apparatus that is adapted to be readily mounted detachably on the adjustable work table of a conventional milling machine or other conventional machine tool preferably having the usual means for stationing its work table in positions that are selectively adjustable in relation to the framework of the machine tool with respect to which the contour generating tool is correspondingly adjustable in all directions.

These and other objects of the invention will appear in greater particular from the following description of the presently improved method and apparatus having reference to the accompanying drawings wherein:

FIG. 1 is a plan view of apparatus embodying the principles of the invention removably mounted on the regular worktable of a conventional milling machine for carrying and feeding work in relation to the rotary cutter of the milling machine while the regular worktable of such machine and the axis of the rotary cutter remain stationed in fixed relation.

FIG. 2 is a front elevation of the apparatus shown in FIG. 1.

FIG. 3 is a view taken mostly in section on the plane 3—3 in FIG. 1 looking in the direction of the arrows.

FIG. 4 is a view taken in section on the planes 4—4 in FIG. 3, looking in the direction of the arrows, showing the parts on an enlarged scale.

FIG. 5 is a view on the same scale as FIG. 4 showing the parts in section on the plane 5—5 in FIG. 3, looking in the direction of the arrows.

FIG. 6 is a diagram illustrative of the principles underlying true duplication of shape during reduction of the size of the guiding contour of a pattern or master piece to that of the profile machined in a workpiece.

FIG. 7 is a fragmentary contracted plan view of parts shown in FIG. 1 drawn on an enlarged scale and showing certain parts in partial section on the plane 7—7 in FIG. 3.

FIG. 8 is a plan view on a reduced scale showing a range of swinging movement in unison of the separate pattern and work carrying rotary tables while such tables are simultaneously rotating both the pattern and the work.

FIG. 8a is a fragmentary view of the parts in FIG. 8 showing a shifted relationship of the rotary tables to their axis of oscillation.

FIG. 9 is an end view of the improved apparatus and the associated supporting structure of a conventional milling machine.

Figure 10:
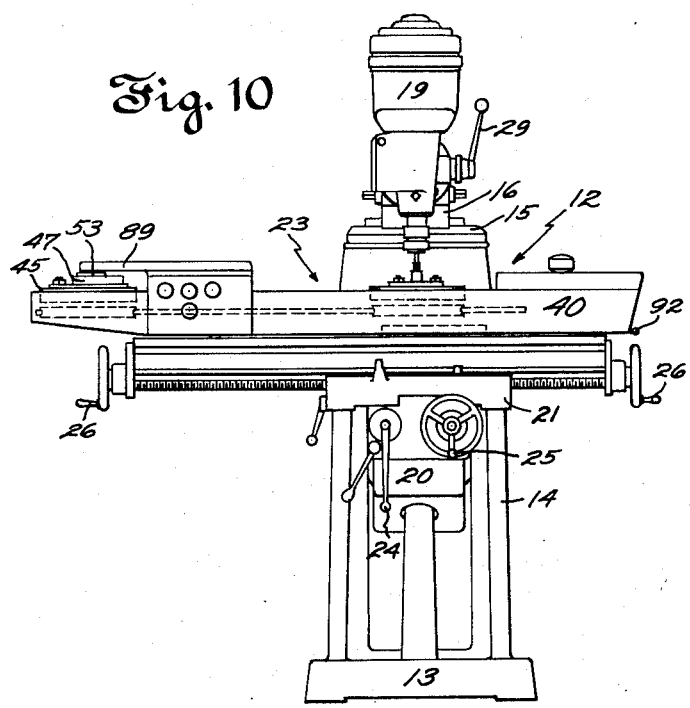
FIG. 10 is a view looking at the front of the milling machine and apparatus shown in FIG. 9.

Referring to FIGS. 9 and 10 a conventional form of milling machine is designated 12. It comprises the usual floor base 13, standard 14, turret 15 and an adjustable rigid overarm 16. The latter carries in stationary but adjustable position thereon a milling tool 17 which is power rotated by an electric motor 18 about a vertical axis at a height determined by the setting of a tool feeding handle 29 above the stationary but adjustable worktable 22 of the millling machine. Motor 18 is carried on milling head 19 which is adjustable on overarm 16. These adjustable parts of the milling machine, other than its power rotated machining tool 17, need not move during the machining operation herein involved but serve merely to support and orient the improved work holding and feeding apparatus in relation to the rotating work cutting tool 17 for practicing the invention. Milling machine 12 is chosen herein as an example of conveniently adjustable support structure to be found in an ordinary machine shop. The milling machine knee 20, saddle 21 and worktable 22 are each independently settable in selective positions in the usual way by turning the handles 24, 25 and 26 respectively.

The improved machining apparatus 23 is mounted as a self-contained unit on the stationed worktable 22 of the milling machine 12. It includes a mounting base ring 28 which may be adjustably secured in fixed relation to the worktable 22 by bolts 27 engaged with the usual T-slots 27' extending lengthwise of the worktable.

Base ring 28 has fixed thereto by a clamp ring 33 the outer race 30 of a radial thrust bearing whose bearing balls 31 are retained by an inner race 32 fixed by a clamp ring 35 to the depending trunnion 34 of a rigid swingable bed beam 40 to which trunnion 34 is adjustably fixed as will later be described. Beam 40 carries and conveys the functioning parts of the improved work feeding apparatus while the regular rotary cutting tool 17 of the milling machine generates in a workpiece 48 a profile shape whose contour is determined by a pattern or master figure 47.

Figure 13:
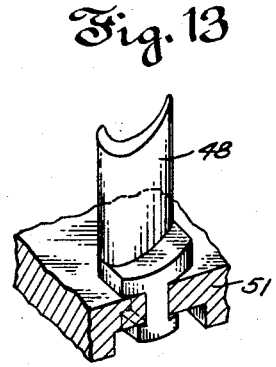
FIG. 13 is a perspective view illustrating a typical workpiece as the detachable bucket of a turbine wheel.

The master figure 47 has an accessible contour which will be duplicated in proportionally smaller size as the contour of a profile shape that is to be generated automatically in workpiece 48. Master figure 47 is carried on and fixedly secured to the face plate of a first rotary table 45 by means of a vise or any suitable holding fixture such as 49 to which the pattern 47 is fixed and which fixture is itself held in adjustable position on the surface of the rotary face plate 67 of a first rotary table 45 by holding bolts 55 that engage T-slots 50 in the face plate. The workpiece 48 is likewise carried on and fixedly secured to the rotary face plate 67 of a second rotary table 46 by means of a vise or any other suitable holding fixture such as 51 which itself is held in adjustable positions on the surface of the face plate by bolts 56 engaging the T-slots 52. FIG. 13 shows a typical workpiece such as 48 rigidly held in a fixture such as 51. Rotary axes P and W are axes of generation.

The axis C of oscillation of bed beam 40 about its ball bearing 31 and also the axes of rotation P and W of the face plates 67 of the respective rotary tables 45 and 46 lie in a common straight line intersecting and radial to axis C as is shown in FIG. 6 and later herein more fully explained.

As both rotary tables 45 and 46 may be constructed alike it will suffice here to describe the construction of one of these tables as shown in detail in FIG. 4 whose duplicate parts in the other rotary table are designated by similar reference numerals. The rotary tables 45 and 46 which are spaced well apart lengthwise of the beam comprise for each table a supporting formation of the web work or partitioning structure of the channeled bed beam 40 in which formations there are incorporated respectively the inner fixed annular flanges 60 and 61. To each of flanges 60 and 61 there is rigidly secured the outer race 62 of a radial thrust bearing whose bearing balls 64 are retained by an inner race 65 fixedly secured by a clamp ring 66 to the rotary face plate 67. Face plates 67 have the usual work anchoring T-slots 50 and 52 respectively. Beneath the ball bearings 64 there is located a worm wheel 68 fixed to face plate 67 and driven by a worm 69. Both of the worms 69 are fixed on the same long horizontal shaft 70.

As shown in FIGS. 1, 3 and 7, worm shaft 70 is journaled in bearings 71 that are removably supported in the rear upright wall of bed beam 40 and this shaft further extends through a terminal bearing 72 that is integral with the bed beam. Adjacent bearing 72 shaft 70 fixedly carries a driven sprocket wheel 73. Clearance holes are provided in the partitions of the channeled bed beam to enable shaft 70 to pass therethrough. A drive chain 78 is trained about driven sprocket wheel 73 and about a driving sprocket wheel 74 on the output shaft 75 of a speed reducing transmission unit 79 whose input shaft 84 carries the driven pulley 80 powered through a belt 81 from a driving pulley 82 on the power shaft 85 of an electric motor 18. Both the transmission unit 79 and motor 18 are bolted fixedly on the bed beam 40 in outboard relation to the axis of oscillation C of the latter, or in other words on the opposite side of axis C from the rotary tables 45 and 46, whereby to counterbalance the weight of the rotary tables with respect to the ball bearing 31 that mounts the bed beam.

An anti-frictional abutment for countering the non-circular revolving contour of master figure 47 is provided in the form of roller abutment 53 supported to be freely rotatable at the end of horizontal arm 89 of the rigid stationary bracket 54 that overlaps bed beam 40 and overhangs rotary table 45. Bracket 54 is adjustably secured in rigid relation to the milling machine table 22 by four fastening bolts 87 that engage the T-slots 27' in the table. Thus when once adjusted, the absolute and relative positions of machining tool 17 and roller abutment 53 remain fixed and unchanged during machining of the work when performed by the improved method of the present invention.

For practising such improved method with the assistance of apparatus capable of functioning automatically, it is preferred that the bed beam 40 be biased to swing clockwise about its axis C in FIGS. 1, 7 and 8 in a manner to keep the boundary contour of the rotating pattern or master figure 47 constantly pressed against the roller abutment while traveling in contact therewith. As an example of conveniently operated manual means for so biasing the bed beam, FIGS. 1 and 8 show a beam biasing extension spring 91 and a swingable, spring tensioning and spring disabling arm 92 to which the spring is pivotally anchored at 93. The opposite end of spring 91 is pivotally anchored at 94 to the stationary base ring 28 that is fixed on worktable 22 and that pivotally supports the bed beam. Arm 92 is pivotally mounted at 95 on the bottom surface of the swingable bed beam 40 and swings relatively thereto therebelow, and is provided with positive stops 96 and 97 spaced apart at the end of the bed beam to limit the arc of swinging movement of arm 92. Spring 91 immediately underlies arm 92. The use of spring 91 cooperatively with roller abutment 53 acts as an oscillation controller, the abutment serving as a stationary reference point with which the pattern contour of rotating generatrix or master figure 47 is automatically maintained in coincidence to cause and govern the oscillatory movement of the bed beam 40.

For machining the workpiece in accordance with less than the whole extent of the profile contour of master figure 47, the drive of both rotary tables 45 and 46 by reversible motor 18 can be stopped automatically and/or reversed in direction by a choice of settings of control lugs 101 and 102 carried adjustably on face plate 67 of rotary table 45. Lugs 101 and 102 can be secured on rotatable faceplate table 45 in various circumferential positions in relation to the master figure 47 by any suitable means such as screws 103 insertable in a choice of threaded holes 103' in the face plate. As the ends of a predetermined range of rotary travel of the face plate, lugs 101 and 102 throw a rocker 104 pivoted at 105 on the bed beam 40 which rocker by swinging in one direction actuates the limit switch 106 and sy swinging in the opposite direction actuates the limit switch 107. Such actuation of the limit switches acts in well known manner through electromagnetic relay switches (not shown) located in the beam carried housing 108 and connected to motor 18 by suitable electric wiring (not shown) to stop and/or reverse the running of motor 18 so that if desired the machining action on workpiece 48 can be repeated in reverse directions of feeding of the workpiece. Lugs 101 and 102 can be removed when a full cycle of the workpiece contour is to be machined and such machining operation can automatically be repeated ad infinitum until stopped or reversed manually through actuation of additional switches 108 in the electrical system by means of push buttons 109.

Figure 11:
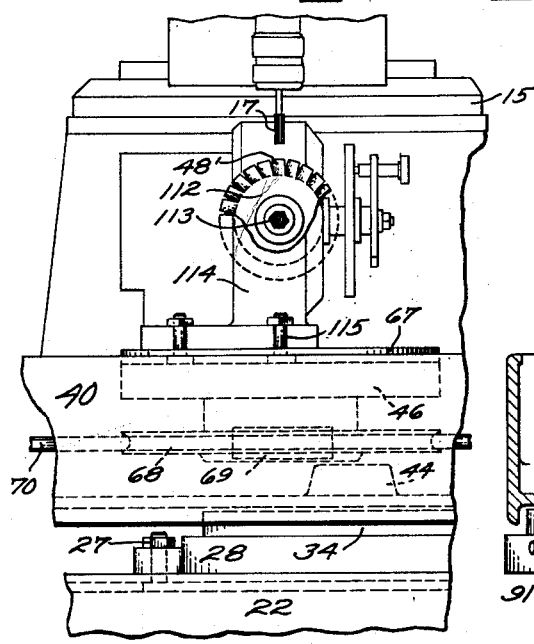
FIG. 11 shows in front view a modified setup of a different kind of work piece for utilizing the improved methods of this invention in generating pattern determined profiles one by one in buckets which form integral spoke-like blades of a turbine wheel.
Figure 12:
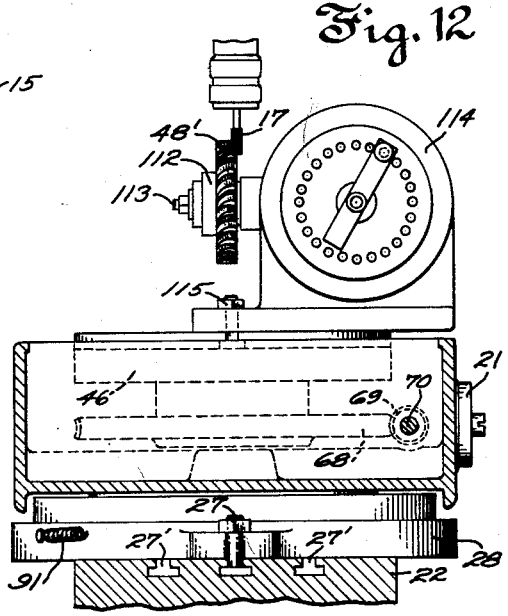
FIG. 12 is a view looking from the right at the setup of work in FIG. 11.

In FIGS. 11 and 12 a modified setup of the workpiece is shown wherein the work to be machined, instead of being a single bucket detached from the rim of a turbine wheel, comprises an entire turbine wheel such as 112, having spoke-like buckets projecting from its periphery and that are integral therewith. The turbine wheel is fixed on the work holding rotary spindle 113 of a conventional dividing head 114 such as is well-known in machine shop practice for holding and stepping the circular position of a gear blank when milling gear teeth therein. Dividing head 114 is so fixed on face plate 67 of rotary table 46 as by bolts 115, that the top-most bucket 48' occupies the same position relative to the axis of rotation W of rotary table 46 as does the single detached bucket 48 in FIGS. 1, 7 and 8. The machining tool 17 is sufficiently small in diameter to enter and traverse the space between adjacent buckets 48' as the dividing head and its carried turbine wheel both revolve about axis W while also being swung toward or away from the machining tool about the axis of oscillation C of the bed beam.

In operating the apparatus hereinbefore described the master figure 47 will be fixed on rotary table 45 and a workblank will be fixed on rotary table 46 in positions shown in FIGS. 1, 7 and 8. The machining tool 17 and worktable of the milling machine will be stationed in such relationship as to height levels that the tool 17 overlaps the workblank to whatever vertical extent of cut is to be generated in the latter. The tool driving motor 18 and the work feeding motor 18 are then started and the spring tensioning arm 92 is thrown from its self-maintained full line position to its self-maintained broken line position in FIGS. 1 and 8 whereupon spring 91 biases the bed beam 40 to swing clockwise about axis C in said figures of the drawings always as far as is determined by the constant riding contact of the rotating master figure 47 against the stationed roller abutment 53. The resulting composite movement of the workblank 48 about both of axes W and C feeds the work with strong leverage into the rotating cutter 17 and thus progressively machines in the workpiece a profile shape whose contour is a duplicate of that of master piece 47 in a truly proportioned reduced size.

The method and apparatus described is based on the general relationship of parts diagrammed in FIG. 6 wherein the machine setup is such that the center of rotation of roller abutment 53 lies in the same circular arc A struck from oscillation axis C as does the axis P about which the pattern or master figure 47 rotates, while the center of machining tool 17 lies in the same circular arc B struck from the same oscillation axis C as does the axis W about which the workpiece rotates. Also with reference to the straight lines R, $R^1$ and $R^2$ in FIG. 6, all of which are radial to the axis of oscillation of bed beam 40, line R passes through the centers of rotation of roller 53 and tool 17, line $R^1$ passes through the point of contact of roller 53 with master figure 47 and through the point of contact of tool 17 with workpiece 48 or 48' in tangential relation thereto, and line $R^2$ passes through both the axis of rotation P of the master figure 47 and axis of revolution W of the workpieces 48 or 48'.

Provision is made in the following way for adjustably varying the distances which separate the axes of rotation or revolution W and P from their common axis of oscillation C without altering the constant distances separating the rotary axes W and P. This is accomplished by a construction which enables the distance separating work axis W from the axis of oscillation C in FIG. 8 to be increased from that shown in FIG. 8 to the greater corresponding distance of work axis W from the shifted axis of oscillation C' in FIG. 8a. Here the ratio of size of the workpiece to that of the master figure becomes 1 to 5, instead of 1 to 10 as in FIG. 8. Such construction resides in the fastening of trunnion 34 to bed beam 40 by at least two bolts 36 and 37. Bolt 36 in boss 43 of the bed beam serves when loosened as a swivel permitting connection between trunnion 34 and the floor wall of bed beam 40 and is eccentric to the axis of oscillation C. Bolt 37 serves as a fastening bolt in either boss 42 or boss 44 which when tightened in boss 42 locks the trunnion 34 and beam 40 rigidly together in their relative positions shown in FIG. 8. Bolt 36 when removed from boss 42 is capable of being shifted to boss 44 and thereby to its position shown in FIG. 8a. This enables the relative rotary positions of trunnion 34 and bed beam 40 to be shifted to their relationship in FIG. 8a. Thereupon the distance W–C in FIG. 8 becomes increased to W–C' in FIG. 8a. This causes the contour to be generated in the workpiece 48 to be increased from one tenth of the size of the pattern 47 to one fifth of the size of the pattern 47. However in setting up the work in this altered adjustment the relationship of the lines R, $R^1$ and $R^2$ to the centers of the roller 53 and tool 17 and to the point of contact of the pattern and workpiece and to the centers of rotation P and W will be established as is demonstrated in FIG. 6, and the ratio of the diameters of machining tool 17 and abutment roller 53 should be altered to correspond with the revised ratio of 1 to 5 instead of 1 to 10.

With work set up according to these principles, the irregular contours of cams or parts for other purposes can constitute the workpiece to be shaped to contours generated by this improved method with or without the aid of apparatus as herein disclosed, wherefore the following claims are directed to and intended to cover the underlying principles of such method and apparatus also when practiced and embodied in method steps and construction differing in detail from the herein disclosed examples.

What is claimed is:

1. A machine for generating in a workpiece a surface of revolution, comprising a swingable bed beam, a generatrix adapted to revolve about a first axis in fixed relation to said bed beam, means to revolve a workpiece about a different axis coplanar with said first axis and in fixed relation to said bed beam, means carried by and confined to said bed beam to impart to said generatrix and to said workpiece revolving means identical angular velocity of continual rotary movement relative to said bed beam, means mounting said bed beam to swing about a stationary axis of oscillation which lies in substantially the same plane as said first axis and said different axis, a stationed work machining tool, oscillation governing means stationed to sense the contour of said revolving generatrix, and means for mounting said tool and said swingable bed beam and governing means on said machine in a manner to cause said bed beam to oscillate about its said fixed axis in response to said governing means.

2. A machine tool for generating in a workpiece a uniplanar peripheral contour like that of the uniplanar peripheral contour of a pattern in proportionate differing size, comprising in combination with the supporting frame structure of a machine tool, a bed beam pivotally mounted on said supporting structure and limited to swinging movement in a fixed plane about a single axis of oscillation relative thereto and perpendicular to said fixed plane, a first rotary table mounted on said bed beam equipped to carry and rotate a pattern upon a pattern axis confined to parallellism with said single axis of bed beam oscillation, a second rotary table mounted on said bed beam equipped to carry and rotate a workpiece upon a work axis fixedly parallel with said single axis of oscillation and with said pattern axis, a prime mover carried on said bed beam connected to rotate said first and second tables simultaneously at equal angular speeds during and independently of the oscillation of said bed beam about only said single axis of oscillation, a work processing tool stationed on said frame structure in the path of the combined rotary and oscillatory movements of a workpiece carried by said first rotary table, an abutment stationed on said frame structure in position constantly to encounter the periphery of a rotating pattern carried on said first rotary table so as to limit the oscillatory movement of said bed beam in one direction, and means to bias said bed beam to swing about said single axis of oscillation in a direction to urge said pattern into oscillation controlling constant contact with said abutment and simultaneously to urge said workpiece into operable contact with said tool during combined oscillatory movement of said bed beam and power driven simultaneous rotary movements of said pattern and workpiece.

3. A machine tool as defined in claim 2, together with a rotary support for the said bed beam pivotally mounted on the said framework of the machine, and releasable fastening means constructed to secure said bed beam to said rotary support in variable positions relative to the said axis of oscillation.

4. A machine tool as defined in claim 3, in which the said rotary support comprises a stationary ring, a radial thrust ball bearing mounted in said ring, and a support plate journaled in said ball bearing carrying the said bed beam.

5. The method of generating in a workpiece a uniplanar peripheral outline like the uniplanar outline of a pattern periphery in proportionate different size, which comprises the steps of, revolving about a first axis and in peripheral coincidence with a fixedly stationed reference point the uniplanar outline of a pattern periphery which at least in part girds said first axis at varying radial distance therefrom, simultaneously rotating a workpiece in susceptible relation to a fixedly stationed outline generator about a second axis disposed parallel with and fixedly spaced from said first axis at an angular speed equal to the angular speed of revolution of said pattern outline and swinging both of said axes laterally and simultaneously in respectively different concentric arcs about a common third axis of oscillation parallel with said first and second axes, whereby to generate a uniplanar peripheral outline in said rotating workpiece while said pattern outline revolves in coincidence with said reference point.

6. The method defined in claim 5, together with the additional step of varying to like extent the said radial distances of each of the said arcs of oscillation to the said stationary common axis of curvatures of said arcs while maintaining constant the distance between the said axes of rotation of the said pattern and of the said workpiece respectively.

References Cited by the Examiner
UNITED STATES PATENTS

| | | | |
|---|---|---|---|
| 1,925,025 | 8/33 | Amann | 90—13 X |
| 2,506,734 | 5/50 | O'Brien | 90—13.9 |
| 2,593,363 | 4/52 | Thalmann | 90—13.7 |
| 2,720,141 | 10/55 | Seyferth | 90—13.9 |
| 2,741,163 | 4/56 | Smedley | 90—13.4 |
| 2,742,823 | 4/56 | Compton | 90—13.1 |
| 2,784,649 | 3/57 | Von Zelewsky | 90—13.7 |
| 2,902,905 | 9/59 | Meyer | 90—13.4 X |

WILLIAM W. DYER, JR., *Primary Examiner.*

LEON PEAR, *Examiner.*